United States Patent [19]
Blom

[11] Patent Number: 4,979,650
[45] Date of Patent: Dec. 25, 1990

[54] DRIVE ARRANGEMENT FOR METERING MECHANISMS

[75] Inventor: Erik Blom, Mariestad, Sweden

[73] Assignee: Jede AB, Sweden

[21] Appl. No.: 378,218

[22] PCT Filed: Dec. 14, 1987

[86] PCT No.: PCT/SE87/00598
§ 371 Date: Jun. 21, 1989
§ 102(e) Date: Jun. 21, 1989

[87] PCT Pub. No.: WO88/04769
PCT Pub. Date: Jun. 30, 1988

[30] Foreign Application Priority Data
Dec. 22, 1986 [SE] Sweden .................................. 8605511

[51] Int. Cl.$^5$ ............................................. G01F 11/10
[52] U.S. Cl. ..................................... 222/197; 222/333; 222/361
[58] Field of Search ............................ 222/129.1–129.4, 222/196–197, 305, 333, 361–362, 504, 336, 339

[56] References Cited

U.S. PATENT DOCUMENTS

| | | | |
|---|---|---|---|
| 2,652,176 | 9/1953 | Lime | 222/361 |
| 2,857,083 | 10/1958 | Masterson | 222/361 |
| 3,439,917 | 4/1969 | Bode | 222/129.3 X |
| 3,955,718 | 5/1976 | Von Holdt et al. | 222/197 |
| 4,629,093 | 12/1986 | Le Molaire | 222/361 X |

FOREIGN PATENT DOCUMENTS

| | | | |
|---|---|---|---|
| 1773884 | 4/1972 | Fed. Rep. of Germany . | |
| 103062 | 12/1963 | Norway | 222/361 |
| 678872 | 9/1952 | United Kingdom . | |
| 1329415 | 9/1973 | United Kingdom . | |
| 2109342 | 6/1983 | United Kingdom | 222/361 |

Primary Examiner—Michael S. Huppert
Attorney, Agent, or Firm—Davis, Bujold & Streck

[57] ABSTRACT

A metering arrangement for powdered material, particularly powdered beverage ingredients, includes a storage container (18), an outfeed box (22) located beneath the storage container and having an outfeed opening (46), and a reciprocatingly movable outfeed slide (60). The outfeed slide and the outfeed box are embraced by a rubber band (78), for returning the outfeed slide. The outfeed slide co-acts with a motor (36) drivingly operating the slide (40) having an L-shaped cut-out (100) in which a slide driver (94) eccentrically mounted on the crankshaft (92) of the motor is intended to move. When dispensing a metered quantity of powder, the slide driver moves in the transverse leg of the L-shaped cut-out during a first half of a revolution so as to draw out the operating slide (40) and the outfeed slide (60). The slide driver then passes into the longitudinal leg of the L-shaped cut-out and releases its engagement with the operating slide (40), whereupon the outfeed slide (60) and the operating slide (40) are snapped back by the rubber band (78). The outfeed slide therewith strikes against the outfeed box (22) and generates a shock wave which shakes any arched or bridge-like incrustation present in the storage container (18).

11 Claims, 3 Drawing Sheets

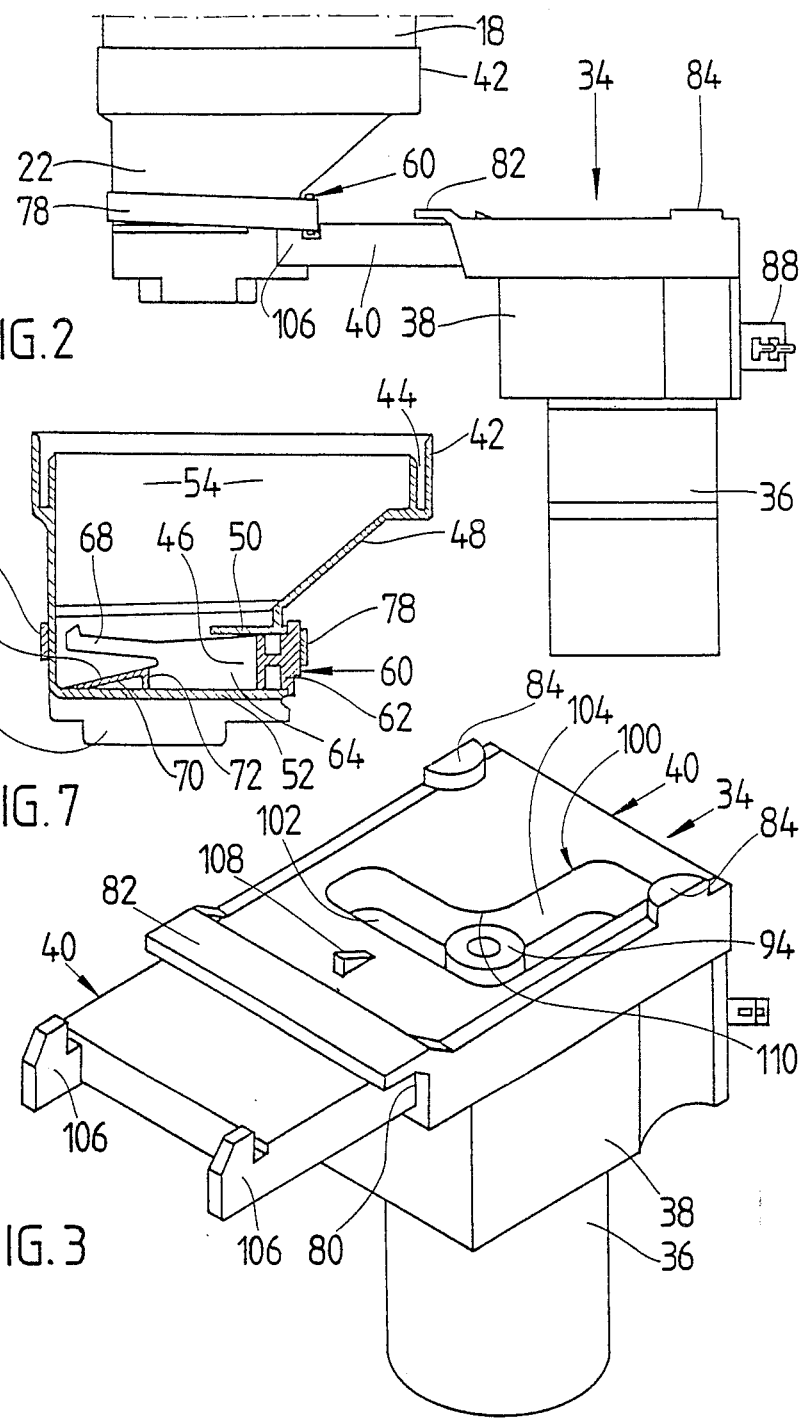

DRIVE ARRANGEMENT FOR METERING MECHANISMS

The present invention relates to a metering arrangement for powdered materials, and particularly, but not exclusively, for metering measured quantities of powdered materials in beverage dispensers.

One problem encountered when metering powdered products for the preparation of beverages is that the powder grains tend to interlock in their respective storage containers, to form bridge-like incrustations or to form arches, thereby impairing the dispensing action of the metering means. This problem is particularly manifest when the surroundings are very humid, such that the powder grains will tend to agglomerate. Certain powdered ingredients are even more liable to form such incrustations or arches than others. The formation of a bridge-like incrustation may mean that the full measure of powdered ingredient is not portioned out which, particularly in the case of coin operated beverage dispensers, may cause irritation and result in lost working time and also in additional maintenance costs, since the fault has to be rectified by service personnel. These bridge-like incrustations may possibly be broken up or dispersed by rapping on the dispenser or by shaking the same. This may result in damage to the dispenser, however. There is thus a great need for metering or portioning apparatus which are capable of metering powdered beverage ingredients from a storage container without the formation of bridge-like or arched incrustations, even in highly humid environments or when handling materials which have a high tendency towards forming such arches.

Consequently, the object of the present invention is to provide a metering arrangement of the aforesaid kind in which arching of the powdered ingredients is prevented and the powdered ingredients are caused to sink down during the whole of the emptying process. A further object of the invention is to provide a reliable portioning or metering arrangement of simple construction which is relatively cheap to manufacture and which has low installation, maintenance and servicing costs.

These objects are achieved with a metering arrangement constructed in accordance with the present invention.

These and other advantageous features of the invention will become more apparent from the following detailed description of a non-limiting exemplifying embodiment of the invention made with reference to the accompanying drawings, in which FIG. 1 is a cross-sectional view of an automatic beverage dispenser comprising a storage container for powdered beverage ingredients and a metering arrangement according to the invention;

FIG. 2 is a side view in larger scale of the metering arrangement illustrated in FIG. 1;

FIG. 3 is a perspective view of the metering arrangement drive motor with associated motor attachments and operating slide;

FIG. 7 is a cross-sectional view of the outfeed box illustrated in FIG. 6.

Figure 1:
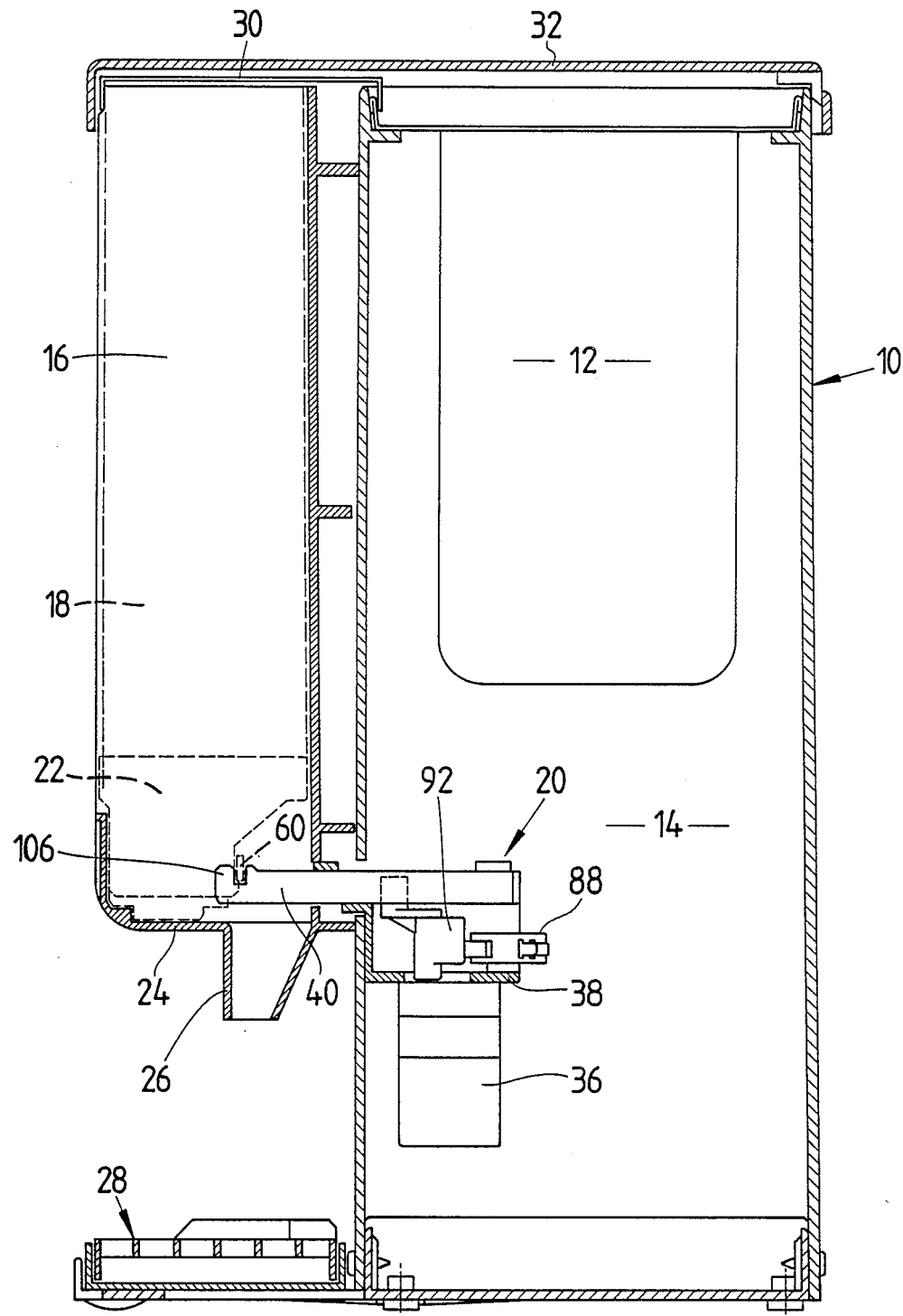
Figure 6:
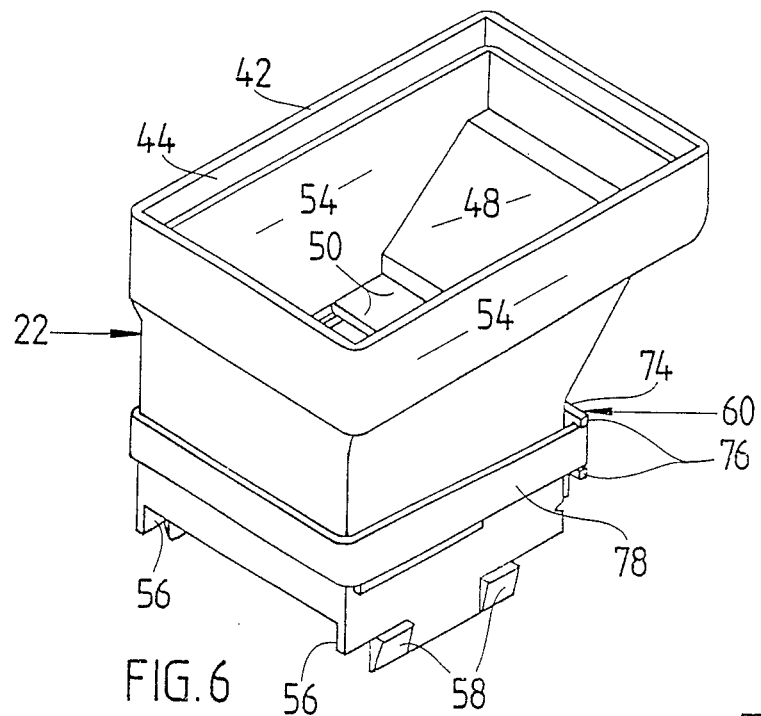
FIG. 6 is a perspective view of an outfeed box intended for feeding out portions of powdered ingredients in accordance with the invention.

FIG. 1 illustrates a beverage dispenser 10 comprising a liquid container 12 for, e.g., hot or cold water located in a container space 14 and connected to a liquid supply arrangement not shown. Located at the front of the dispenser is an accommodation space 16 for accommodating a number of storage containers 18 for beverage ingredients. The dispenser is not limited to a specific number of containers, and may incorporate solely one container. When several containers 18 are provided, the requisite number of metering arrangements 20 are simply located adjacent one another. Each storage container is connected at the bottom thereof with an outfeed box 22, via which the storage container rests on a shelf 24 incorporating a discharge funnel 26. A cup or mug support plate 28 having a drip pan is located beneath the discharge funnel or funnels. The storage containers are secured by means of a fitting or cover plate 30 at the top of respective containers. The storage containers and liquid containers are covered by the lid 32 of the dispenser.

The inventive metering arrangement is illustrated in larger scale in FIG. 2 and comprises the outfeed box 22 and an operating mechanism generally referenced at 34 and comprising a drive motor 36, a motor attachment 38, and an operating slide 40. The constructional configuration of the various components and their mutual interaction will be apparent from the following description of the separate components made with reference to FIGS. 3–7.

The outfeed box 22 (FIG. 6) has a raised lip 42 which incorporates a groove 44 into which a corresponding edge of the storage container 18 is fitted. The outfeed box has a front wall 48 which slopes down towards the discharge opening 46 of the box. The opening 46 is closed at the top thereof by a shelf 50 and at the bottom thereof by the bottom 52 of the outfeed box. The outfeed box also comprises side walls 54, which have wall portions 56 which extend beneath the bottom 52. The outer surfaces of the downwardly extending wall portions 56 are provided with hook-like attachment projections 58, by means of which the outfeed box and storage container can be secured in position, e.g. to the dispenser shelf 24, or to form a connection with an operating mechanism. Arranged in the discharge opening 46 is an outfeed slide 60. The outfeed slide has substantially the form of a bottomless frame and comprises a front wall 62, side wall 64 and a dogging device 66. Holding devices in the form of two hooked arms 68 are provided on the side walls of the frame or box. The dogging device 66 has an angled cross-sectional shape and comprises a surface 70 which slopes gently in the rearwards direction and an essentially vertical front wall 72 foradvancing a metered portion of powder. The front wall 62 has an essentially H-shaped cross-section in order to enhance its bending resistance. The front wall has provided on the short side thereof outwardly projecting lugs 74, each of which has a recess which embraces a projection 76. The projections and recess form attachment means for a rubber band 78 which embraces the front wall of the outfeed slide 60 and the outfeed box 22. This rubber band forms a resilient return means for returning the outfeed slide 60.

Figures 4, 5:
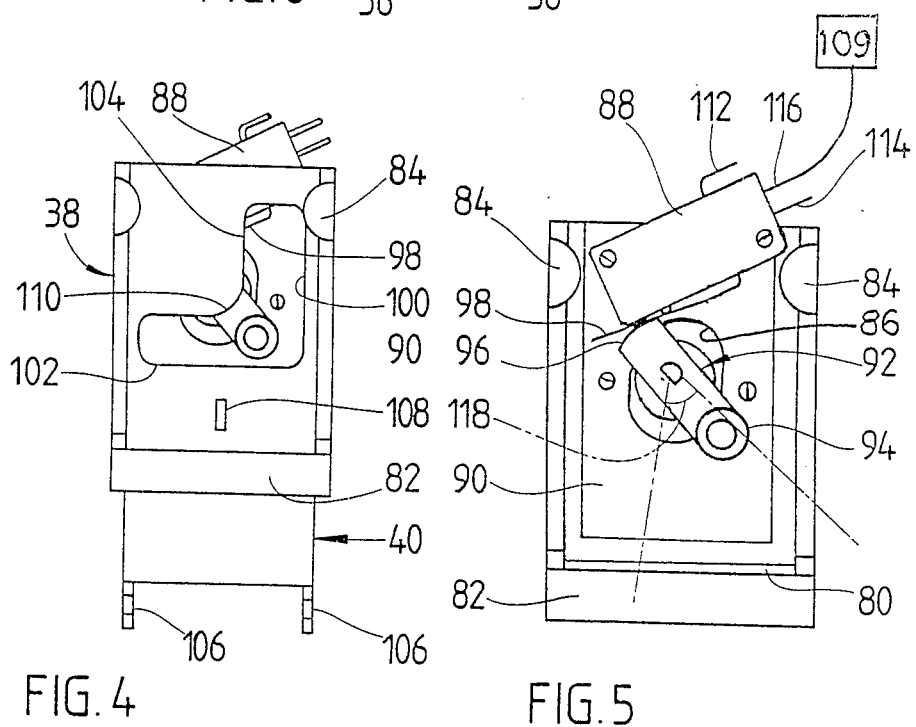
FIG. 4 is a plan view corresponding to FIG. 3.
FIG. 5 is a plan view of the drive motor and motor attachment with the operating slide removed to show a microswitch.

The motor attachment 38 of the operating mechanism can best be seen from FIGS. 3 and 4, and has an essentially box-like configuration and presents at the top thereof a cross-strut 82, which defines a slide opening 80, and two shoulders 84 which retain the slide 40. Provided at the bottom of the motor attachment is a bore 86 for accommodating an axle and holes for securing the drive motor 36 and a microswitch 88 located in the internal crank-shaft space 19 of the motor attachment.

The drive motor 36 is preferably a direct-current geared motor of variable speed and having a crankshaft 92. The crankshaft includes an eccentrically arranged slide driver 94 and a lifting cam 96 which is located opposite the slide driver in the illustrated embodiment and which is intended to operate the breaker contact 98 of the microswitch.

The operating slide 40 forms the movement transmission means between the operating mechanism 34 and the outfeed slide 60. The operating slide 40 incorporates an L-shaped cut-out for accommodating the slide driver 94 and having a transverse leg 102 and a longitudinal leg 104. The slide 40 is provided on the end thereof facing the outfeed box with two hook-shaped projections 106 which engage behind the lugs 74 on the outfeed slide, inwardly of the rubber band 78. The slide 40 is also provided with an upwardly projecting locking shoulder 108 having a sloping insertion surface, this shoulder enabling the slide 40 to be inserted but prevents the slide from being withdrawn past the cross-strut 82. The maximum length of stroke of the slide 40 is thus limited by the hook-shaped projection 106 and the locking shoulder 108.

The portioning o metering arrangement operates in the following manner. In the starting position for slide movement, the crankshaft 92 is directed with the slide driver 94 essentially downwards in FIG. 4 and against the outfeed box 22. The crankshaft then begins to rotate in a clockwise direction, whereupon the slide driver 94 moves in the transverse leg 102 while dogging the operating slide and also the outfeed slide 60 via the hook-shaped projection 106. When the crankshaft has rotated through one half of a revolution and the slide driver is located at a "12 o'clock" position, the outfeed slide has completed a complete outfeed movement and has dispatched a metered quantity of powder down through the outfeed opening 46 and through the outfeed funnel 26. During its continued movement, the slide driver 94 passes the inner corners 110 of the L-shaped cut-out or slot 100 and continues out into the longitudinal leg 104 of the slide aperture. This releases contact of the operating slide 40 with the slide driver 94. The rubber band 78 will now return the outfeed slide to its starting position, with a highly accelerated movement. The operating slide 40 accompanies this movement. The slide driver 94 does not take part in this movement of the outfeed slide and upon completion of its movement is located furthest up in the longitudinal leg 104. Return movement of the outfeed slide 60 is stopped abruptly, when its front wall 62 and the outwardly projecting lugs 74 strike against the outfeed box in the region around the outfeed opening 46. Consequently a powerful shock wave propagates through the outfeed box 22 and to the walls of the container 18, via the raised lip 42 and the groove 44. This shock wave causes the outfeed box and container walls to vibrate, so as to impart motion to any powder located thereon and subsequently collapsing any arches and bridge-like incrustations that may have formed. The drive motor continues to rotate, causing the slide driver 94 to move in the longitudinal leg 104, although without imparting movement to the operating slide. Movement of the drive motor and the slide feeder is then stopped automatically by means of a control system.

As will be understood from the aforegoing, the drive mechanism includes means for smoothly displacing the outfeed slide (namely the slide feeder in co-action with the transverse leg 102 of the cut-out 100), and means for snap-like, spring-operated movement of the outfeed slide (preferably returning the slide to its starting position), (the rubber band 78), the longitudinal leg 104 of the cutout 100 ensuring at the same time that the slide driver 94 is out of engagement with the outfeed slide during its return movement.

In order to provide the eccentrically arranged slide driver sufficient space for said snap-like return stroke and for its own return movement, the longitudinal leg or slot is wider than the transverse leg or slot. Alternatively, the inwardly located corner 110 of the cut-out may be cut inwardly or bevelled. In addition, the central part of the longitudinal leg or slot must be capable of allowing the slide feeder to pass during return movement of the slide feeder to its starting position, subsequent to the snap-like return of the outfeed slide. On the other hand, the L-shaped cut-out need not present any sharp points, since the slide feeder never reaches this part of the cut-out.

The transverse leg or slot 102 has essentially the same width as the diameter of the slide feeder. Normally, only the inwardly located side of the L-shaped cut-out will come into contact with the slide feeder. Consequently, the opposite side of the cut-out 104 may have any desired configuration. The illustrated, preferred configuration, however, has a control function, since it ensures that the operating slide, and therewith the outfeed slide 60, are actually returned to their respective starting positions. Any accumulation of material will prevent this, resulting in a metering of a smaller quantity of powdered ingredient. The machine will stop if the slide fails to return to its starting position, which in turn means that the dispenser will need to be serviced, to remove the accumulated powder or obstructing powder agglomerates.

In principle, the slide driver can be caused to stop in any selected position along the longitudinal leg 104, subsequent to the snap-like return stroke, up to the aforementioned preferred starting position directed immediately downwards in FIGS. 4 and 5 and centrally of the transverse leg 102. This is achieved by means of a control system comprising components which are preferably mounted on a circuit card, with the co-action of the microswitch 88. The microswitch 88 has an input 112, a first output 114 and a second output 116. When the switch is open, motor current passes through the first output 114 direct to the drive motor 36, which then rotates at a high speed. When the microswitch closes, the current passes instead through the second output 116 and through a series resistance arranged on the drive motor circuit card. This causes the motor to slow down, and the motor can be brought to a gentle stop. When starting a new dispensing cycle, the resistance can be by-passed in a known manner, e.g. with the aid of a relay, so that a new metering cycle can be initiated at full speed. The microswitch is illustrated in its open position in the drawings, with the slide driver located within the sector 118 shown in chain lines.

As will be understood, other spring-like return means can be used instead of the rubber band 78, for example a coil spring arranged on respective sides of the outfeed box. A rubber band is to be preferred, however, since it can readily be replaced with one or more, optionally doublefolded, rubber cords. A coil spring, on the other hand, is a manufactured spare part which is not always available and which may take time to deliver.

It will also be understood that the metering arrangement according to the invention can be constructed so that the snap-like stroke, or impact stroke, takes place during the outfeed movement, this movement being engendered by rubber bands or springs. Furthermore, the outfeed slide can be caused to stop at some other location in its movement path, e.g. subsequent to completion of an outfeed movement. It is preferred, however, to terminate said movement in the inserted position, since the front wall of the outfeed slide then closes effectively the outfeed opening 46 of the outfeed box. The H-shaped profile of the front wall assists effectively in preventing spillage, by moving back a part of the powder into the outfeed opening.

The illustrated embodiment includes an operating slide having an L-shaped cut-out 100 which co-acts with an eccentric, rotating slide driver 94 in a manner to abruptly release the outfeed slide 60 and the operating slide 40. The invention is not restricted, however, to this method of releasing the slides, and it will be understood that this release can be achieved in other ways, e.g. by means of one or more spring-biassed hooks which co-act with guide surfaces in a manner to be brought out of engagement with either slide at the end of a sliding movement, preferably in the outfeed direction of the slide. Such means for releasing at least the outfeed slide in order t return the slide in a snap-like manner can also be combined with a manual outfeed arrangement.

In the operating position the operating slide 40 is positively secured in the motor attachment 38 by means of the cross-strut 82 and the holding shoulders 84. Withdrawal of the operating slide is prevented by the slide driver 94 and the locking shoulder 108. Assembly is effected in the following manner. The slide driver is positioned obliquely within the region of the longitudinal leg 104 of the cut-out 100. The slide is then moved in an upwardly oblique direction, this being made possible by the bottom rearwardly withdrawn edge of the slide opening 80 (see FIG. 5). The slide is then moved down over the slide feeder and pushed in, the locking shoulder sliding beneath the cross-strut 82 to firmly lock the slide.

The inventive outfeed box can be connected to any desired container. For example, in a first variant the outfeed box is connected to a fillable container permanently located in a beverage dispenser. It may, however, alternatively be connected to a replaceable, disposable container, i.e. a cardboard carton containing powdered beverage ingredient. Finally, the outfeed box may be permanently connected to a disposable carton and thus also constitute a disposable article. This can be realized economically, since very large numbers are involved and therewith low single-piece prices.

The invention is not restricted to the aforedescribed preferred embodiment, and modifications can be made within the scope of the inventive context through a selected combination of the various features within the scope of the following claims.

I claim:
1. A metering arrangement for powdered material, particularly powdered beverage ingredients comprising a storage container (18), an outfeed box (22) located beneath the storage container and provided with an outfeed opening (46), and a reciprocating movable outfeed slide (60), having spring means for returning the outfeed slide, which is arranged to be displaced axially to an outfeed position against the spring force of the spring means and to be returned to its starting position in a snap-like manner by said spring means, characterized in that the aforesaid movements are effected by means of a drive mechanism (34) which includes a drive motor (36) having a crankshaft (92) which is oriented essentially at right angles to the plane of said movements and has an eccentrically located end (94) which functions as a slide driver and which is mounted in an essentially L-shaped cut-out (100) provided in an operating slide (40) activated by said spring force via the outfeed slide, said cut-out having a traverse leg or slot (102) which extends transversely to the displacement direction for conforming movement of the slide to the outfeed position, and having a longitudinal leg or slot (104) extending in the direction of slide displacement, for snap-like automatic return of the two slides (40 and 60) to the starting position.

2. A metering arrangement according to claim 1, characterized in that the outfeed opening (46) of the outfeed box (22) is partially closed at the top by a shelf (50) and is closed at the bottom by the bottom (52) of the outfeed box; in that the outfeed opening (46) accommodates the outfeed slide (60), which has essentially the shape of a bottomless box and comprises a front wall (62), side walls (64) and a dogging device (66) located between the rear ends of said walls; and in that the dogging device (66) has an angled cross-sectional shape presenting a gently and rearwardly sloping surface (70) and an essentially vertical front wall (72) for advancing a metered quantity of powder.

3. A metering arrangement according to claim 2, characterized in that the side walls (64) of the outfeed box (22) terminate in rear hook-like members for holding the box in the opening (46).

4. A metering arrangement according to claim 2, characterized in that the short sides of the front wall means for receiving a rubber band (78) which embraces the have opposed lugs (74), each lug having a pair of horizontally extending projections defining a recess therebetween, each recess forming front wall of the outfeed slide (60) and the outfeed box (22) and forms said spring means for returning the outfeed slide (60).

5. A metering arrangement according to claim 1, characterized in that the drive motor (36) has a motor attachment (38) of essentially box-shape and presenting at the top thereof a cross-strut (82) at the end thereof facing the outfeed slide, said cross-strut defining an opening (80) for the operating slide (40), and two shoulders (84) at the other end for holding the slide (40).

6. A metering arrangement according to claim 5, characterized in that the motor attachment (38) is provided at the bottom thereof with a bore (86), for the crankshaft (92), and holes for securing the drive motor (36) with the aid of screws, and a microswitch (88), having a breaker tongue (98), is arranged in an internal crankshaft space (90) of the motor attachment and the breaker tongue (98) of the microswitch is operated via a lifting cam (96) opposite the slide driver.

7. A metering arrangement according to claim 4, characterized in that the operating slide (40) has on the end thereof facing the outfeed box two hook-shaped projections (106) which engage behind the lugs (74) of the outfeed slide inwardly of the rubber band (78).

8. A metering arrangement according to claim 1, characterized in that the longitudinal leg (104) of the cut-out (100) is wider than the transverse leg (102) and said transverse leg has essentially the same width as the diameter of the slide driver, and an inner corner (110) joining the transverse and longitudinal legs has a smooth transition.

9. A metering arrangement according to claim 1, characterized in that the slide driver (94) is caused to stop, subsequent to the snap-like return movement, at a selected position within the longitudinal leg (104) by a control system means having components mounted on a circuit card in co-action with a microswitch (88), which has an input (112), a first output (114) and a second output (116).

10. A metering arrangement according to claim 9, characterized in that when the microswitch is opened current passes via the first output (114) directly to the drive motor (36), which then rotates at a high speed (6); when the microswitch is closed current passes through the second output (116) and a series resistance arranged on the circuit card and this slows down rotation of the and drive motor; when starting a new dispensing cycle the resistance can be by-passed in order to initiate a new metering cycle at full speed.

11. A metering arrangement according to claim 5, characterized in that the operating slide (40) has on an end thereof facing the outfeed box two hook-shaped projections which engage behind opposed lugs carried by the outfeed slide (60), the operating slide (40) has an upwardly projecting locking shoulder (108) which presents a sloping insertion surface which enables insertion of the operating slide (40) but prevents said slide from being withdrawn past the cross-strut (82) and the maximum length of stroke of the operating slide is limited in one direction by the hook-shaped projections (106) and in the other direction by the locking shoulder (108).

* * * * *

UNITED STATES PATENT AND TRADEMARK OFFICE
CERTIFICATE OF CORRECTION

PATENT NO. : 4,979,650

DATED : December 25, 1990

INVENTOR(S) : Erik BLOM

It is certified that error appears in the above-identified patent and that said Letters Patent is hereby corrected as shown below:

Column 5,
    line 68 delete "reciprocating" and insert --reciprocatingly--.

Column 6, line 23 delete "partially";
    line 39 after "wall" insert --have opposed lugs (74), each lug having a pair of horizontally extending projections defining a recess therebetween, each recess forming--; and
    line 41 delete "have opposed lugs (74), each lug having a pair of horizontally extending projections defining a recess therebetween, each recess forming".

Column 8, line 3 after "motor" insert --and--.

Signed and Sealed this

Twenty-sixth Day of May, 1992

Attest:

DOUGLAS B. COMER

*Attesting Officer*  *Acting Commissioner of Patents and Trademarks*